March 15, 1927. 1,621,051
H. F. AYOUB
STEERING WHEEL LOCK
Filed Jan. 11, 1926
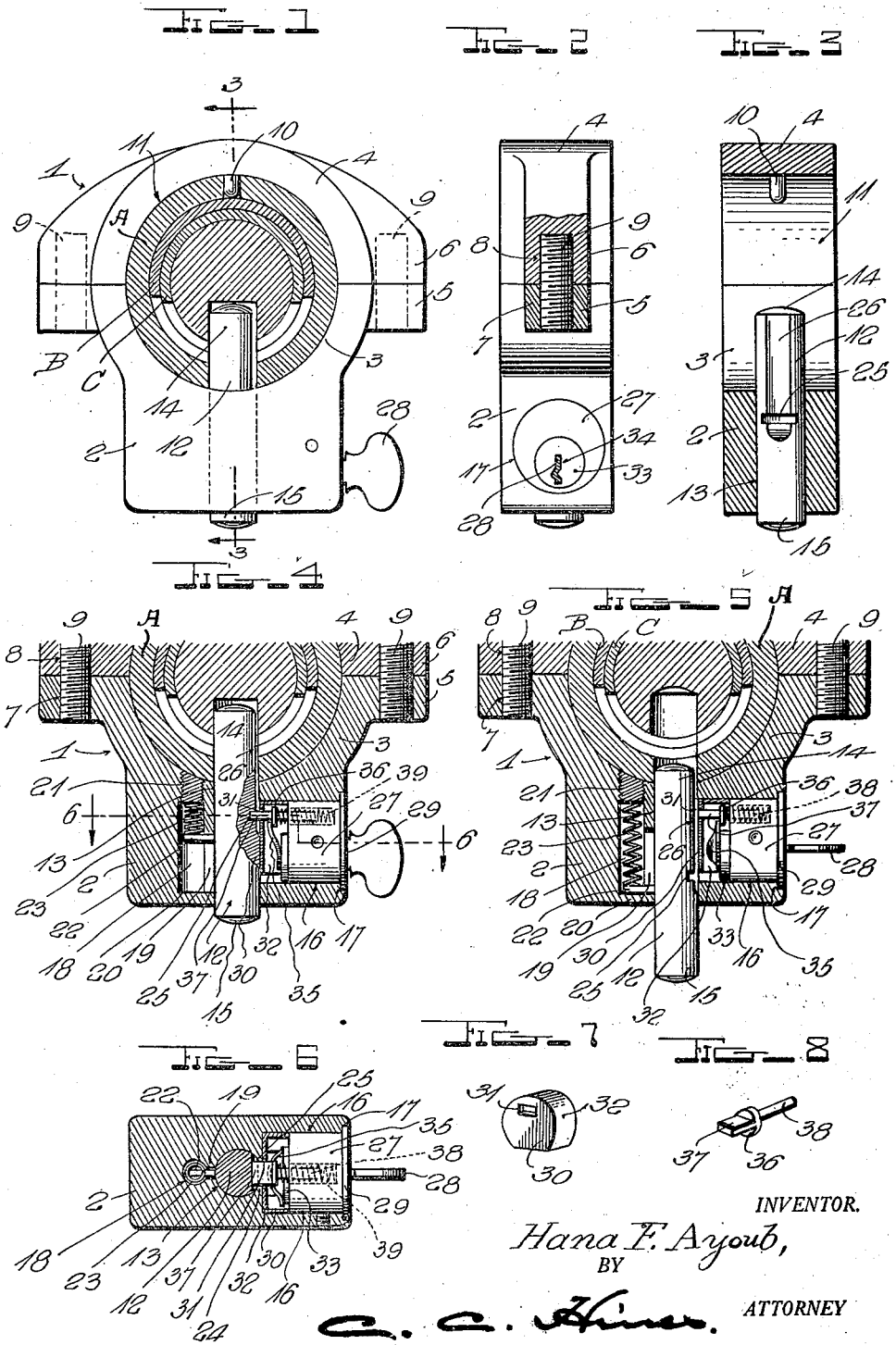
INVENTOR.
Hana F. Ayoub,
BY
ATTORNEY Patented Mar. 15, 1927.

1,621,051

UNITED STATES PATENT OFFICE.

HANA F. AYOUB, OF EL PASO, TEXAS.

STEERING-WHEEL LOCK.

Application filed January 11, 1926. Serial No. 80,595.

This invention relates to locks and particularly to locks for the steering wheels of automobiles, motorcycles, bicycles and other vehicles.

One object of the invention is to provide a simple, reliable and inexpensive construction of lock which will hold a steering wheel or steering gear against steering movement so as to prevent theft or operation of the vehicle by unauthorized persons.

Another object of the invention is to provide a lock having a lock bolt which may be set by pressure when a key is in locking position and is adapted to move automatically to a positive releasing position when the key is turned to release position, thereby preventing sticking of the bolt and ensuring its positive retraction to a full degree on a manipulation of the key to proper position.

Still another object of the invention is to provide a lock which, while of simple and inexpensive construction, is proof against access to its working mechanism and its being tampered with to render it inoperative within any reasonable period of time, thus ensuring all reasonable safety against theft of the vehicle.

In the accompanying drawing showing the use of my invention, for example, for locking the steering rod of an automobile from movement,—

Figure 1 is a horizontal cross-section through the steering column and related parts of an automobile steering gear, showing the lock applied thereto.

Figure 2 is an end elevation of the lock, partly in section.

Figure 3 is a section on the line 3—3 of Figure 1.

Figure 4 is a fragmentary view similar to Figure 1, showing the lock in section and the bolt projected.

Figure 5 is a view similar to Figure 4, showing the bolt retracted.

Figure 6 is a section on the line 6—6 of Figure 4.

Figure 7 is a view of the flanged disk.

Figure 8 is a view of the latch.

Referring now more particularly to the drawing, 1 designates my improved lock, which comprises a casing 2 having at one side a semi-circular portion 3 cooperating with a similarly shaped clamp member 4 to form a circular shackle, whereby the lock is adapted to be arranged to embrace an automobile steering column or the like. The parts 3 and 4 are provided with bosses 5 and 6, the bosses 5 being formed with threaded passages 7 and the bosses 6 with threaded sockets 8 to receive threaded fastening keys or plugs 9. These keys or plugs 9 may be initially in the form of headed screws, the heads of which are cut off flush with the outer faces of the bosses 5 through which the passages 7 open after the parts are fastened together, leaving the screws devoid of surfaces which may be gripped or engaged to permit removal of the screws. The part 4 may, therefore, be made initially separate from the lock casing to permit the lock to be applied to an automobile steering column. A or the like without removal of the steering wheel. When the heads of the screws are cut off the screws cannot be removed without difficulty or attracting attention in case an attempt is made to surreptitiously remove them, thus giving ample measure of protection against the possible unauthorized removal of the lock in this manner. Any other safe mode of permanently connecting the parts 3 and 4 after application of the lock for use may, however, be employed.

The clamp 4 is provided at a medial point with a projection 10 extending into the shackle opening 11. The projection is adapted for cooperation with a sliding lock bolt 12 to hold the lock centered on the steering column against displacement. In practice, the steering column is bored at one side to receive the projection 10, and the column and contained sleeves B—C are bored at the opposite side to receive and permit movement of the inner end of the bolt 12, the steering rod or shaft being formed with a socket to receive such inner end of the bolt when the latter is projected, so that the steering gear may be locked with the steering wheels in any prescribed position. The projection 10, in the event of wear of the locking end of the bolt, will prevent the lock from shifting out of proper position for engagement of the locking bolt with its receiving socket in the steering rod or shaft. From the foregoing the application of the invention for use upon the steering gear of an automobile will be apparent.

The bolt 12 is movable in and through an opening 13 extending diametrically through the casing in axial alinement with the projection 10. The bolt is of greater length than the opening 13 so as to normally present a locking end 14 and a manipulating end 15. The end 14 normally extends into the shackle opening 11 a sufficient distance to terminate flush with the inner surface of the inner sleeve enclosed by the column when the bolt is in retracted position, allowing proper clearance for the normal rotation of the steering shaft, and the openings in the sleeves (gas and spark) being sufficiently large to permit of their free movements without interference from the bolt, while the outer end of the bolt is always exposed to an extent to permit it to be manually manipulated for projection.

At one side of the bolt passage 13 the casing 2 is provided with a circular chamber 16 which opens at its outer end through one of the lateral faces of the casing and at such end communicates with an inset groove or rabbet 17. At the opposite side of the bolt passage 13 from the chamber 16 the casing 2 is formed with a second chamber 18. This chamber 18 extends radially inward from the shackle opening 11 and communicates with the passage 13 through a slot 19 and said chamber has a bottom wall 20 at its base or outer end and is closed by a plug 21 at its inner end. A pin 22 is fixed to and projects from the bolt through the slot 19 into the chamber 18, in which chamber is enclosed a spring 23 acting on said pin to hold the bolt normally retracted. A slot 24 connects the passage 13 with the chamber 16, through which the adjacent side of the bolt is exposed to the chamber 16, and said side of the bolt is provided with a locking notch 25 and is flattened, as indicated at 26, for engagement at its lateral margins with the said walls of said slot 24 to hold the bolt from rotation and to also ensure the registration of the notch with and its exposure through said slot. When the bolt is retracted the notch 25 is disposed at a point in proximity to the outer end of slot 24.

A cylinder 27 is fitted in the chamber 16 and is locked in position by a key 28. This cylinder has at its outer end a flange 29 countersunk in the recess 17. The inner end of this cylinder terminates in spaced relation to the wall of slot 24, against which wall fits a sheet metal guide plate 30 having an opening 31 communicating with the upper end of said slot. A flange 32 extending part way around the plate is provided to frictionally engage the wall of chamber 16 and hold said plate in position. Fitted for rotation in the cylinder 27 is a tumbler 33, said tumbler having a keyway 34 of a determined form. At its inner end this tumbler carries a cam disk 35 adapted for movement between the plate 30 and a shoulder 36 on a latch 37 having a shank portion 38 slidable in a socket in the cylinder and adapted to be projected by a spring 39 surrounding said shank between the cylinder and shoulder 36. The disk is so shaped that on a half revolution of the cylinder in one direction the latch will be permitted to move inward to locking position under pressure of spring 38, while on a reverse half revolution of the cylinder the latch will be pressed backward to retracted position against the resistance of the spring, which is thereby tensioned. On its movement to locking position the latch head passes through the opening 31 in the guide plate 30, which opening is so arranged as to lie in register with the notch 25 in the bolt 12 when the latter is moved inwardly to locking position under pressure on its end 15 against the resistance of its retracting spring 23. On the forward movement of the bolt to locking position the bolt head snaps into engagement with the notch 25. When, however, the bolt is retracted by the cam the bolt will be released and will be retracted by its spring 23. It will thus be seen that when the latch is projected by the cam its head will extend into the slot 19 and ride in contact with the surface of the bolt and be held by the latter in partly retracted position against the resistance of spring 38 during the forward movement of the bolt and until notch 25 comes into alinement with the latch head, whereupon the pressure of spring 38 will seat the bolt head in the notch 25. The bolt will then be held locked in projected position with its end 14 engaging the keeper recess in the steering shaft or other part to be held locked. The bolt will be so held until a proper key is inserted in the key guideway and the tumbler turned back to release position, in which action the cam positively retracts the latch, whereupon spring 23 positively retracts the bolt. It is evident, of course, that, with the latch in locking position, movement of the bolt to locking and locked position is accomplished by pressure of the thumb or finger of the operator on the bolt end 15.

A lock of the type described is simple of construction, inexpensive of production, so that it may be manufactured and sold at a comparatively low cost, and give a high degree of safety in use. While the construction disclosed is preferred, it will, of course, be understood that various changes in the form, proportions and details of construction, falling within the scope of the appended claims, may be made without departing from the spirit or sacrificing any of the advantages of the invention.

Having thus fully described my invention, I claim:—

1. In a lock, a lock body having a shackle portion and a casing portion, the latter being provided with a bolt-passage and a chamber arranged at right angles to each other and separated by a wall having a slot affording communication between said passage and chamber, a spring-retracted, manually-projectible bolt movable in said passage and having a flattened side bearing on said wall and provided with a notch exposed at said slot to said chamber, a cylinder mounted in the chamber, a spring-pressed latch carried by said cylinder and movable through said slot to engage said notch when the bolt and latch are in coactive relationship for a bolt locking action, and key-controlled means carried by the cylinder for shifting the latch into and out of bolt engaging position.

2. In a lock, a lock body having a shackle portion and a casing portion, the latter being provided with a bolt-passage and chambers at opposite sides thereof, one of said chambers being parallel with and the other arranged at right angles to the bolt-passage, each chamber being separated from the passage by a partition wall having a slot affording communication between it and said bolt-passage, a spring-retracted, manually-projectible bolt removable in said bolt-passage and having a flattened side bearing against the partition wall between said passage and the second-named chamber, said side of the bolt being provided with a notch exposed through the slot in said partition wall to said second-named chamber, a cylinder mounted in the second-named chamber, a spring-pressed latch carried by said cylinder and movable through the slot in the partition wall against which the flattened side of the bolt bears to engage said bolt notch when the bolt and latch are in coactive relationship for a bolt locking action, key-controlled means carried by the cylinder for shifting the latch into and out of bolt engaging position, a projection carried by the bolt and extending into the chamber parallel with the bolt-passage through the slot in the intervening partition wall, and a spring in said parallel chamber acting on said projection to retract the bolt.

3. In a lock, a lock body having a shackle portion and a casing portion, the latter being provided with a bolt-passage and a chamber arranged at right angles thereto and separated therefrom by a wall having a slot affording communication between said passage and chamber, a spring-retracted, manually-projectible bolt movable in said passage and having a flattened side bearing against the wall and provided with a notch exposed at said slot therein, a cylinder mounted in the chamber, a latch having a shank at one end slidably mounted in the cylinder and having a latch member at its opposite end movable through said slot to engage said notch, said latch being provided with a shoulder between said shank and latch member, a spring about the latch shank acting on the shoulder to project the latch, a rotary key-controlled tumbler carried by the cylinder, and a cam element carried by and rotatable with said tumbler for engagement with the latch shoulder to shift the latch into and out of bolt engaging position.

In testimony whereof I affix my signature.

HANA F. AYOUB.